April 29, 1952     T. R. SMITH     2,595,012
SPRING BIASED VALVE SEAT SEAL
Filed April 3, 1947     3 Sheets-Sheet 2
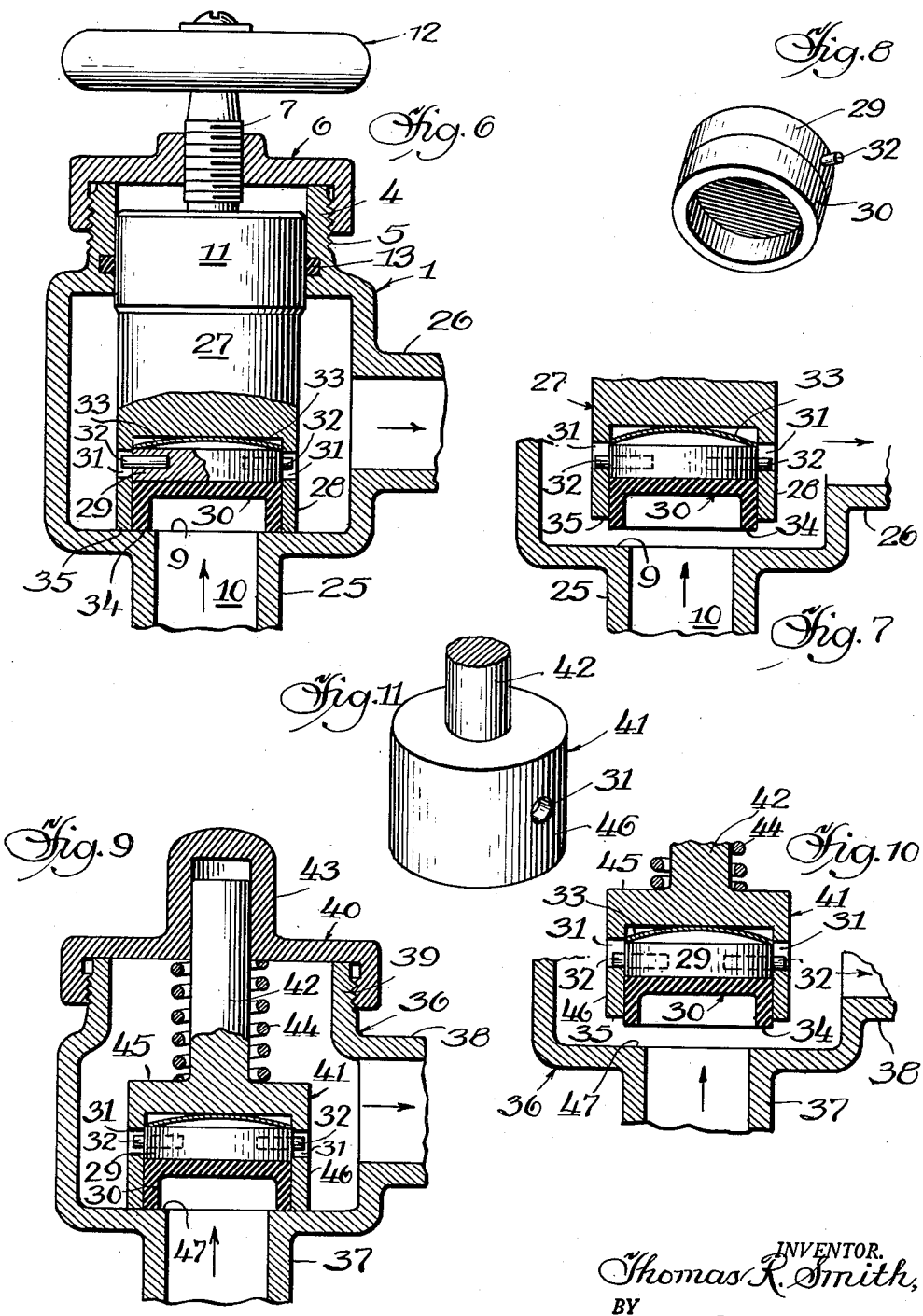
INVENTOR.
Thomas R. Smith, April 29, 1952 T. R. SMITH 2,595,012
SPRING BIASED VALVE SEAT SEAL
Filed April 3, 1947 3 Sheets-Sheet 3
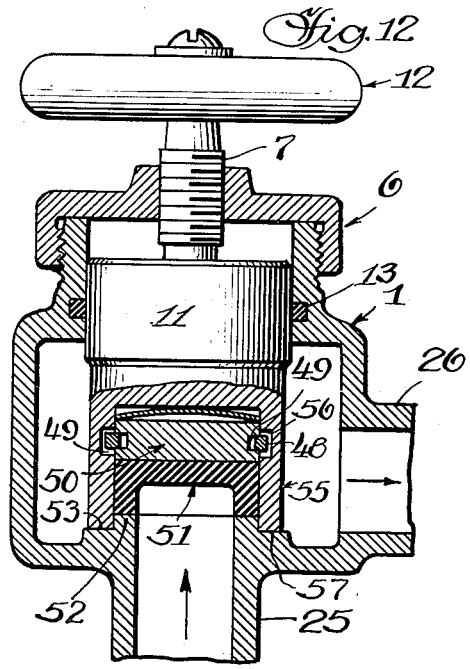
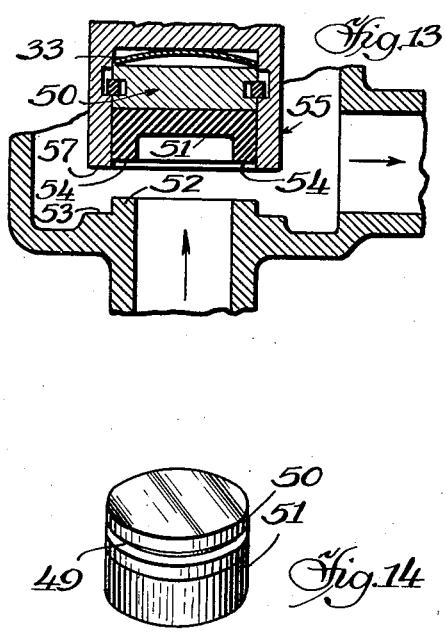
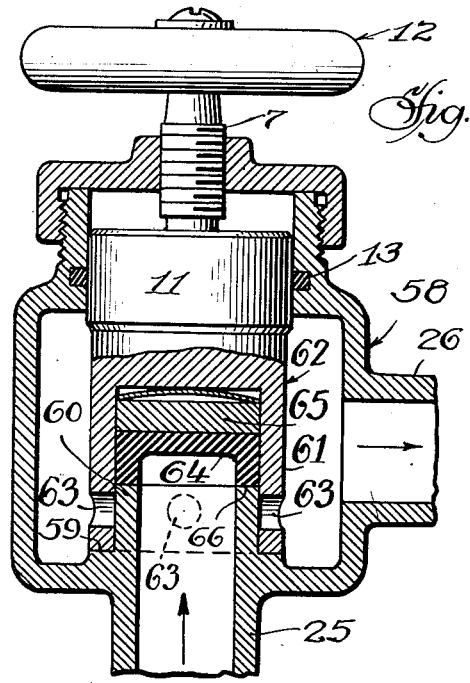
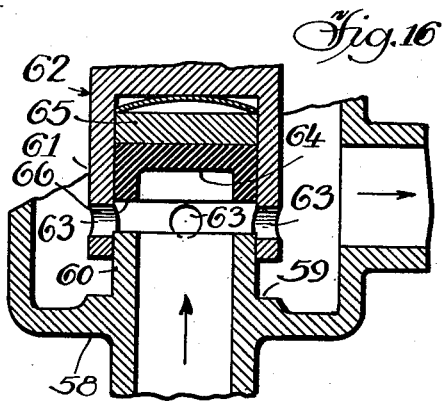
INVENTOR.
Thomas R. Smith,
BY
Carl F. Jeppert
Atty.

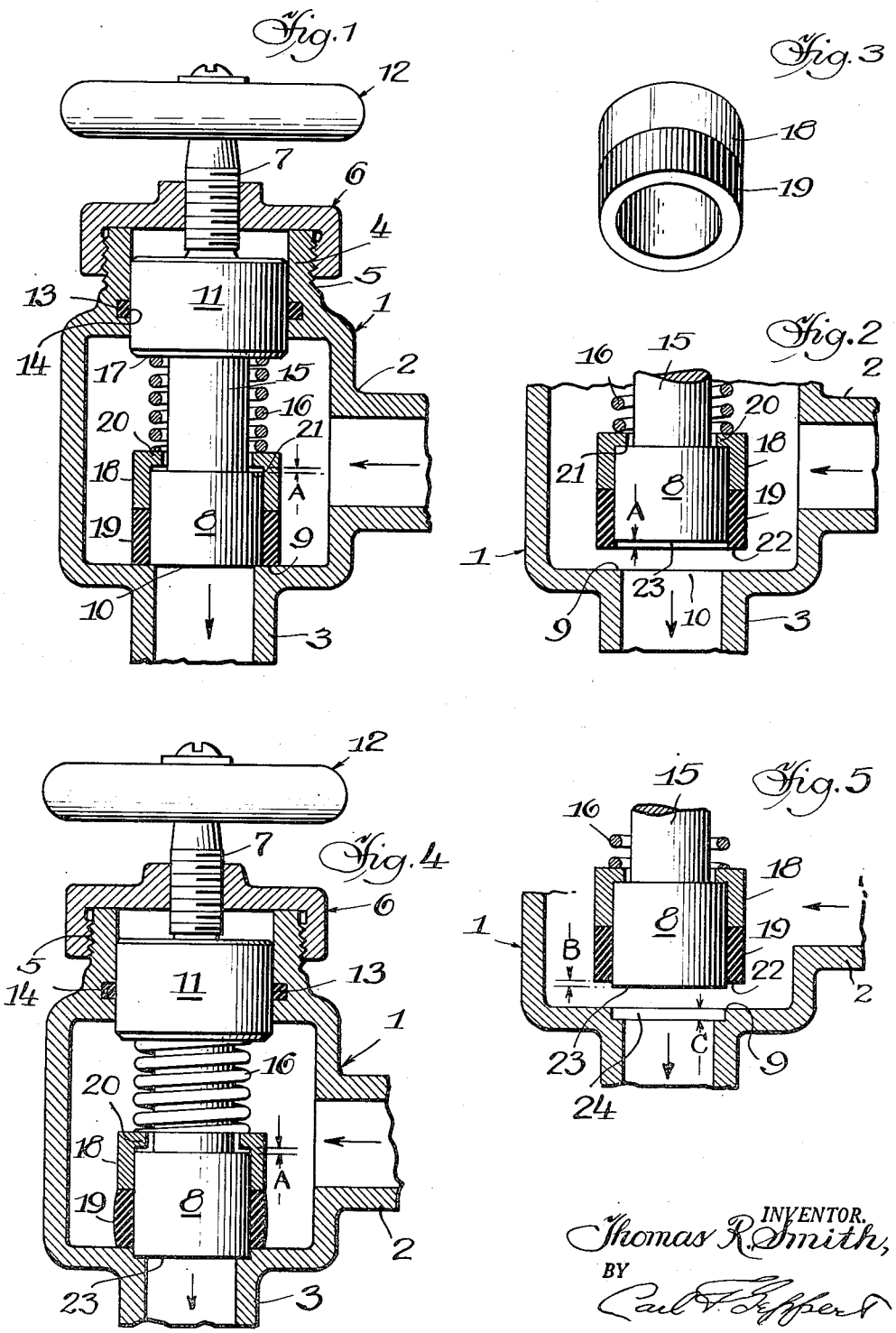

Patented Apr. 29, 1952

2,595,012

UNITED STATES PATENT OFFICE 2,595,012

SPRING BIASED VALVE SEAT SEAL

Thomas R. Smith, Newton, Iowa, assignor to The Maytag Company, Newton, Iowa, a corporation of Delaware Application April 3, 1947, Serial No. 739,045

5 Claims. (Cl. 251—27)

The present invention relates to valve seat seals and especially to a novel seal assembly including a sealing element or member formed or molded of a pliable but non-resilient material.

Among the objects of the present invention is the provision of a novel spring-biased, non-resilient sealing element and a novel means and manner of embodying such sealing element in a valve assembly for use in medium and high pressure applications.

The invention further comprehends a novel spring-biased pliable but non-resilient sealing member carried by a movable plunger but having relative movement with respect thereto, and said sealing member and plunger being so constructed and arranged whereby the sealing member seats ahead of the plunger in such manner as to effect self-sealing.

It is another object of the present invention to provide a novel coacting valve assembly including a longitudinally movable plunger and a non-resilient sealing member movable therewith as well as relative thereto, whereby the sealing member and the plunger each coact with the valve seat in succession but in such manner and sequence as to prevent extrusion of or damage to the sealing member.

Another important feature of the present invention is the provision of a novel means and manner of mounting and supporting the pliable but non-resilient sealing ring or member in such a manner as to prevent distortion or extrusion thereof under all operating conditions, and to maintain the contour or shape thereof under medium and high fluid pressures.

Other important objects are to provide a construction of maximum simplicity, efficiency, economy and ease of assembly and operation, and such further objects, advantages and capabilities as will later more fully appear and are inherently possessed thereby.

The invention further resides in the construction, combination and arrangement of parts illustrated in the accompanying drawings, and while there is shown therein a preferred embodiment, it is to be understood that the same is susceptible of modification and change, and comprehends other details, arrangements of parts, features and constructions without departing from the spirit of the invention.

In the drawings:

Figure 1 is a view part in vertical cross-section and part in side elevation of a novel valve seat seal assembly primarily for use with medium pressures, the valve being shown with the parts in closed position.

Fig. 2 is a fragmentary view of the construction shown in Fig. 1 but with the valve in open position.

Fig. 3 is a view in perspective of the assembled sealing element and retainer therefor.

Fig. 4 is a view similar to Fig. 1 but showing a modified valve construction primarily for use with high pressures, the valve being shown in closed position.

Fig. 5 is a fragmentary view of the device shown in Fig. 4 but with the valve in open position.

Fig. 6 is a view part in vertical cross-section and part in side elevation of another embodiment of my invention in which the novel sealing element is embodied in a spring-biased expanding cup valve seal, the valve assembly being shown in closed position.

Fig. 7 is a fragmentary view of the device shown in Fig. 6 but with the valve moved to open position.

Fig. 8 is a view in perspective of the assembled retainer ring and sealing element.

Fig. 9 is a view part in vertical cross-section and part in side elevation of a further modification in which the seal assembly is shown embodied in a spring-biased relief valve, the valve assembly being shown in closed position.

Fig. 10 is a fragmentary view of the form disclosed in Fig. 9 but showing the parts when the valve is moved to open position.

Fig. 11 is a fragmentary perspective view of the plunger shown in Figs. 9 and 10.

Fig. 12 is a view part in vertical cross-section and part in side elevation of a still further modification of an expanding cup valve seal assembly for use with high pressures, the view showing the valve in closed position.

Fig. 13 is a fragmentary view of Fig. 12 but showing the parts of the valve assembly moved to open position.

Fig. 14 is a view in perspective of the retainer and sealing element shown in Figs. 12 and 13.

Fig. 15 is a view of a still further embodiment of an expanding cup valve seal assembly, the view being taken part in vertical cross-section and part in side elevation and showing the valve in closed position.

Fig. 16 is a fragmentary view of Fig. 15 but showing the valve in open position.

Referring more particularly to the valve seal constructions shown in the accompanying drawings, the novel illustrative embodiments therein shown each disclose a spring-biased valve assembly including a sealing element formed or constructed of a pliable but non-resilient or non-elastic material.

In the illustrative embodiment shown in Figs. 1, 2 and 3, there is provided a valve body 1 having an inlet 2, an outlet 3, and a head 4 threaded at 5 for the reception of a gland cap or closure 6. This cap or closure is provided with a threaded opening for receiving a threaded stem 7 on the upper end of a plunger 8 adapted to engage and seat upon the valve seat 9 formed in the body 1 and encompassing opening 10 in the outlet 3.

The plunger is provided adjacent the threaded stem 7 with an enlargement 11 conformably received within the head 4 and guided thereby in its longitudinal movement when moved to open or closed position by rotation of the handle 12 in the proper direction and through the threaded connection between the stem 7 and the threaded opening in the gland cap or closure 6. To prevent leakage between the complementary surfaces on this enlargement 11 and the interior of the head, a resilient gland seal 13 is disposed in an inwardly opening channel or recess 14 provided in the valve body and with the seal or sealing element 13 maintained in sealing contact with the enlargement.

The plunger is provided with an intermediate reduced part 15, and about this reduced part is provided a coil spring 16 having one end bearing against a shoulder 17 provided on the enlargement 11 and the other end bearing against a retainer 18 for a sealing element 19 slidably mounted on the plunger 8. This retainer is in the form of a sleeve provided with an inturned flange 20 against which the spring abuts, and with the flange also adapted to abut against a shoulder 21 on the plunger and thereby limit its longitudinal movement in one direction.

The sealing element 19 is disclosed as firmly affixed to the end of this retainer as by vulcanizing or the like. This sealing element is formed of a pliable but non-resilient material that will withstand high temperatures. Such compounds are now available and one such material is DuPont's Teflon. This material is pliable and has excellent seating characteristics but lacks resiliency, has a tendency to flow under relatively high pressures and has permanent set characteristics. In the present device, the invention comprehends a novel assembly and mounting for this sealing element whereby to compensate for its non-resilient or non-elastic characteristics and gives a self-sealing construction that is not altered or destroyed by temperatures or pressures within the range of the material selected.

In the open position of the valve shown in Fig. 2, the coil spring 16 in abutting against the flange 20 on the end of the retainer 18, forces this flange against the shoulder 21 on the plunger 8, and in that position the sealing end 22 of the sealing element 19 extends a limited distance "A" beyond the lower end 23 of the plunger. When the valve is closed by moving or lowering the plunger to the position shown in Fig. 1, the sealing end 22 first comes in contact with the flat valve seat 9 in the valve body 1, after which the plunger continues its movement until the lower end or bottom 23 thereof contacts the flat valve seat. Such continued movement of the plunger relative to the sealing element, compresses the spring 16 and brings the end or sealing face of the element 19 and the end or bottom of the plunger on the same level or plane on the valve seat.

The fluid pressure entering the inlet 2 operates to further force the retainer 18 and its sealing element 19 downward against the seat 9 and inward about the end of the plunger 8 to thereby maintain an effective self-sealing action. Although the novel sealing element 19 is pliable and subject to flow under relatively high temperatures and pressures, it cannot be distorted because on two sides it is retained against deformation by the plunger and the valve seat, while the pressure on the other sides is equal in pounds per square inch. Furthermore, the spring 16 is not of sufficient strength to cause distortion as against the fluid pressure holding the sealing element against the plunger. This valve seal construction is especially adapted for use with medium pressures.

Where the pressures are excessively high and which might cause the sealing element to turn under the plunger and be pinched when the valve is moved to closed position, the invention comprehends modifying the structure of Fig. 1 so as to prevent extrusion damage to the sealing element. In this form of the invention (Figs. 4 and 5) the end or bottom 23 of the plunger 8 normally extends a limited distance marked "B" beyond the end or sealing face 22 of the sealing element 19. In the valve seat 9 in the body of the valve is provided a counterbore 24 for receiving the end or bottom 23 of the plunger so that when the plunger is lowered or moved to closed position, the end or bottom thereof enters the counterbore and thereby substantially cuts off all possible extrusion space before the end or face 22 of the sealing element contacts the valve seat 9 surrounding this counterbore. Thereafter, the plunger moves an additional amount equal to the depth or distance "A," which is the amount of back-up compression available. This distance or depth "A" is equal to the distance "C" or depth of the counterbore 24, minus the distance "B." As stated above, the device shown in Figs. 4 and 5 is primarily adapted for use with extremely high pressures or temperatures and where there is danger of the sealing element being extruded as the valve is opened and closed. As the remaining structure and operation is similar to the disclosure in the embodiment shown in Figs. 1, 2 and 3, similar reference characters have been applied thereto.

Where the inlet for the fluid under pressure is from the bottom of the valve body and the outlet is provided at one side thereof, and where the pressures are not excessive, the invention comprehends a novel spring back-up or spring-biased expanding cup valve seal of the type shown in Figs. 6, 7 and 8, mounted within a valve body 1 similar in construction to that shown in Figs. 1 to 5, inclusive, except that the inlet 25 and the outlet 26 are reversed. However, the valve and plunger assembly differ and include a plunger 27 mounted upon the threaded stem 7 and provided at its lower or sealing end with a hollow portion 28 adapted to receive a retainer ring 29, to the lower face of which is affixed as by vulcanization or the like, a cup-shaped sealing member 30. The hollow annular and depending portion of the plunger is slotted at 31, 31 and these elongated slots are of such dimensions as to receive the projecting ends of stop pins 32, 32 carried by the retainer ring 29 and to permit vertical or longitudinal movement of the ring and sealing element relative to the plunger. The sealing member 30 and retainer ring 29 are spring-biased by means of a flat spring 33 seating within the recess in the end of the plunger and bearing against the upper face of the retainer ring. This tends to move and retain this ring and its sealing element in its lowered position.

As disclosed in Fig. 7 in which the valve assembly and related parts are shown in the position they occupy when the valve is in open position, the engaging face or end 34 of the sealing member normally extends beyond the lower end 35 of the plunger and in moving the valve to closed position, the end or engaging face 34 first contacts the valve seat 9 after which the lower end 35 of the plunger seats thereagainst. The sealing member and the retaining ring to which it is securely attached, are thus forced upwardly against the pressure of the spring 33 into the hollow interior or space provided therefor in the plunger by contact with the valve seat and further lowering of the plunger through rotation of the handle 12. In such movement the pins 32 carried by and projecting from the retainer ring ride in the slots 31 so that when the plunger is raised it moves a predetermined distance before the lower edge of the slots contacts the pins and raises the face of the sealing element from the seat. The spring 33 assures that the sealing element contacts the seat 9 ahead of the plunger and after this initial engagement the plunger contacts the seat and then forms a complete enclosure or encasement for the sealing element so that the pressure and temperature involved cannot extrude the material of the sealing element, and with the incoming pressure of the fluid being exerted against the hollow interior of the cup-shaped sealing element possible distortion thereof is maintained at a minimum.

In the form shown in Figs. 9, 10 and 11, the seal construction of Fig. 6 is incorporated in a relief valve having a hollow valve body 36 having an inlet 37, an outlet 38 and a threaded head 39 adapted to be closed by means of a gland cap or closure 40. A plunger 41 is provided with a reduced stem or shank 42 having its upper end slidably received and guided in a hollow and inwardly opening boss 43 on the gland cap. A coil spring 44 encompassing the stem has one end engaging the underside of the cap and the other or lower end seating upon a shoulder 45 provided on the plunger. The sealing member 30 and its retaining ring 29 are received within the hollow portion of the depending annular flange 46 of the plunger 41 and their movement or adjustment limited by the projecting stop pins 32 received in the elongated slots 31. As in Fig. 6 as well as in the forms shown in Figs. 1 and 4, the valve seat 47 provided in the valve body, and the bottom or sealing face of the sealing member 30, are substantially flat for the reason that the material of which the sealing member is formed is not resilient. Thus by having these contacting surfaces substantially flat avoids distortion of the sealing element.

Where the pressure in the fluid line is relatively high, a valve assembly such as that shown in Figs. 12, 13 and 14 is preferably employed. This structure is similarly to that shown in Fig. 6 except for the use of an expanding split ring 48 carried in an annular recess 49 in the retainer or disc 50 to which a cup-shaped sealing element 51 is attached, and the provision of an annular upstanding flange or projection 52 on the valve seat 53 adapted to be engaged by the lower face 54 of the sealing element and received in the hollow or open lower end of the plunger 55.

The expanding ring 48 is adapted to expand and be retained in an annular, inwardly opening channel or groove 56 provided in the hollow plunger 55 and of a height to permit the ring and retainer 50 limited longitudinal movement relative to the plunger, but to prevent the retainer and sealing element from dropping out of the same. In this form of the invention the lower face 54 of the sealing element is normally disposed above the lower end 57 of the plunger as disclosed in Fig. 13 where the valve is shown in open position.

As the plunger is moved to close the valve, the annular raised portion 52 on the valve seat 53 enters the hollow open end of the plunger before the lower end or engaging face 57 on the end of the plunger contacts the valve seat 53 encompassing the annular raised portion 52. Thus sealing is effected first by contact of the sealing element with the raised portion, after which the lower end 57 of the plunger engages the seat 53, although as the end of the plunger extends beyond the end of the sealing element, the plunger end encompasses the annular raised portion 52 before contact is made therewith by the end 54 of the sealing element. This prevents extrusion of the pliable but non-resilient sealing member and the disclosed illustrative construction is especially adapted for use with high pressure systems.

Another embodiment for use with high pressures and similar in numerous respects with that disclosed in Fig. 12, is shown in Figs. 15 and 16. In this form of the invention, the valve body 58 is provided with a valve seat 59 having an annular raised portion 60 extended upwardly to such an extent that the depending hollow end or cylindrical portion 61 of the plunger 62 encompasses and is never out of engagement therewith. The encompassing portion of the plunger is provided with a plurality of spaced openings or ports 63 to permit fluid flow when the cup-shaped sealing element 64 is elevated from the annular raised portion 60 of the valve seat 59. The retainer 65 to which the sealing element is affixed requires no retaining or guiding pins or split ring as employed in the forms shown in Figs. 6, 9 and 12, inasmuch as the plunger 62 never disengages from the raised annular portion 60 and therefore the cup-shaped sealing element 64 and retainer 65 cannot drop down and out of the open end of the plunger.

When the valve is moved to closed position as shown in Fig. 15, the contacting face 66 of the sealing element engages the annular raised portion before the end of the plunger seats against the valve seat 59. However, as the openings 63 are disposed below the contacting face 66, the pliable sealing material cannot extrude into these openings. Also the fluid under pressure entering from below tends to retain the sealing member in elevated position even though it is spring-biased by the flat spring 33.

In the forms of the invention disclosed in the illustrative embodiment, each comprehends the employment of a spring-biased, non-resilient sealing element composed or formed of a pliable material, and in each assembly such pliable material is so constructed, arranged and assembled that the material is held against extrusion or distortion. Also in each form or modification, the pliable but non-resilient sealing member is so mounted as to have relative movement with respect to the cooperating plunger by which it is carried and in which the sealing member seats ahead of the plunger when the valve is moved to closed position, and when the valve is moved to open position the plunger is withdrawn from its valve seat before contact is broken between the engaging end of the sealing element and the portion of the valve seat which it engages.

Having thus disclosed the invention, I claim:

1. In a valve seal for preventing passage of fluid through an opening in a valve body, a valve seat encompassing the opening, a plunger movable toward and away from said seat, a pliable but non-resilient sealing member carried by said plunger and relatively movable axially with respect thereto, said sealing member including an annular part with one of its circumferential walls conforming to and supported by a complementary surface on the plunger and its other circumferential wall open to the pressure of the fluid whereby to prevent distortion of this annular part, spring means carried by said plunger for independently urging said sealing member axially toward said valve seat, means on said plunger for limiting the independent forward movement of said sealing member, and means for closing the opening by moving the end of the plunger and the end of the sealing part into contact with the valve seat with the end of the sealing part being positioned with respect to the end of the plunger so that it contacts the valve seat ahead of said plunger, said spring means permitting the entire sealing member to move relative to said plunger after seating.

2. In a valve construction, a valve seat encompassing a passage, a plunger having a cylindrical wall and a lower end movable into and out of seating engagement with the valve seat, a pliable but non-resilient sealing member carried by the plunger, said sealing member being provided with an annular sealing portion having a circumferential wall in contact with and supported by the wall of the plunger and the other circumferential wall open to the fluid pressure to prevent distortion of said annular portion, spring means encompassing said plunger for independently urging the entire sealing member axially toward said seat, means on said plunger for limiting the forward movement of said sealing member, and means for moving said plunger to close said passage by moving the end of said plunger and the end of said annular sealing portion into contact with said valve seat, the end of the sealing portion being positioned with respect to the end of said plunger so that it contacts the valve seat ahead of the plunger, said spring means permitting said sealing member to shift axially with respect to said plunger after contacting said valve seat to limit the axial pressure applied to said sealing member.

3. In a valve construction, a valve seat encompassing a passage, a plunger having a cylindrical wall and a lower end movable into and out of engagement with said valve seat, a relatively movable pliable but non-resilient sealing element including an annular sealing portion with a sealing end carried by said plunger, said annular portion having a circumferential wall subject to fluid pressure and the other circumferential wall in contact with and supported by said cylindrical wall of said plunger to prevent distortion of said annular sealing portion, a rigid back up member for the upper end of said sealing portion, spring means encompassing said plunger for independently urging the entire sealing element axially toward said seat through said back-up member, means carried by said plunger for limiting the forward movement of said sealing element, and means for moving said plunger to close said passage by moving the end of said plunger and said sealing portion into contact with said valve seat, the end of said sealing portion being positioned with respect to the end of said plunger so that it contacts said valve seat ahead of said plunger, said spring means acting upon movement of said plunger after said sealing element contacts said valve seat to permit relative axial movement of the entire sealing element with respect to said plunger to limit the axial pressure applied to said sealing element.

4. In a valve seal for preventing passage of fluid through an opening in a valve body, a valve seat encompassing the opening, a plunger movable toward and away from said seat, a pliable but non-resilient sealing member carried by said plunger and relatively movable axially with respect thereto, said sealing member including an annular part with one of its circumferential walls conforming to an supported by a complementary surface on the plunger and its other circumferential wall open to the pressure of the fluid whereby to prevent distortion of this annular part, spring means carried by said plunger for independently urging said sealing member axially toward said valve seat, and means for closing the opening by moving the end of the plunger and the end of the sealing part into contact with the valve seat with the end of the sealing part being positioned with respect to the end of the plunger so that it contacts the valve seat ahead of said plunger, said spring means permitting the entire sealing member to move relative to said plunger after seating.

5. In a valve seal for preventing passage of fluid through an opening in a valve body, a valve seat encompassing the opening, a hollow plunger movable toward and away from said seat, a retainer ring and a pliable but non-resilient sealing member carried by said plunger within the hollow thereof and relatively movable axially with respect thereto, said sealing member having an annular sealing part with one of its circumferential walls conforming to and supported by a complementary surface on the interior of the plunger and its other circumferential wall open to the pressure of the fluid whereby to prevent distortion of this annular part, spring means carried by said plunger for independently urging said retainer ring and sealing member axially toward said valve seat, means for limiting the axial movement of the retainer ring and sealing member in said plunger, and means for closing the opening by moving the end of the plunger and the end of the sealing part into contact with the valve seat with the end of the sealing part being positioned with respect to the end of the plunger so that it contacts the valve seat ahead of said plunger, said spring means permitting the entire sealing member and retainer ring to move relative to said plunger after seating.

THOMAS R. SMITH.

REFERENCES CITED

The following references are of record in the file of this patent:

UNITED STATES PATENTS

| Number | Name | Date |
| --- | --- | --- |
| 1,764,991 | Siebs | June 17, 1930 |
| 2,131,928 | Abegg | Oct. 4, 1938 |
| 2,179,165 | Sifkouitz | Nov. 7, 1939 |
| 2,311,110 | Johnson | Feb. 16, 1943 |
| 2,394,243 | Joyce | Feb. 6, 1946 |
| 2,403,029 | Smith | July 2, 1946 |

FOREIGN PATENTS

| Number | Country | Date |
| --- | --- | --- |
| 17,847 | Great Britain | of 1896 |